March 25, 1924.
J. HAW
PROPELLER FOR AIRCRAFT
Filed Feb. 16, 1921

Inventor:
Jakob Haw
By Wm Wallace White
ATTY.

Patented Mar. 25, 1924.

1,488,243

UNITED STATES PATENT OFFICE.

JAKOB HAW, OF BERLIN, GERMANY.

PROPELLER FOR AIRCRAFT.

Application filed February 16, 1921. Serial No. 445,550.

*To all whom it may concern:*

Be it known that I, JAKOB HAW, a citizen of the German Republic, residing at Berlin, Germany, have invented new and useful Improvements in Propellers for Aircraft (for which I have filed applications in Germany, Serial H. 68,945/77h, filed Sept. 11, 1915, patented under No. 300,200; Germany, Serial H. 70,048/77h, filed April 11, 1916, patented under No. 309,361; Germany, Serial H. 70,077/77h, filed April 14, 1916, patented under No. 332,539; Germany, Serial H. 70,156/77h, filed April 29, 1916, patented under No. 332,540; Germany, Serial H. 70,530/77h, filed June 30, 1916, patented under No. 332,541; Germany, Serial H. 75,954/77h, filed Jan. 21, 1919, patented under No. 332,428; Austria, Serial A. 1,311–17, filed March 22, 1917, patented under No. 87,219; Austria, Serial A. 1,313–17, filed March 22, 1917, patented under No. 87,220; Hungary, Serial H. 5,877, filed April 13, 1917, patented under No. 75,493; Hungary, Serial H. 5,878, filed April 13, 1917, patented under No. 76,645), of which the following is a specification.

This invention relates to a propeller for air-craft which has the advantage of a simple and practical construction and is at the same time extremely strong and rigid and possesses also exceptional durability.

The propeller is characterized by the feature that its blades are made up of cross-pieces, consisting of wood or other light and rigid material, for example a material which is artificially prepared from cellulose, paper-pulp or the like, which are threaded on steel rods fixed in pairs to the boss of the propeller. These cross-pieces are stuck or glued together and securely fastened in groups to the steel rods by means of cross-straps which are adjustable on and capable of being fixed to the steel rods. The strength and rigidity can be still further increased if the groups of cross-pieces are also interlocked by means of pegs or pins which are inserted in them in different positions in the various groups. This form of construction is particularly suitable for propellers having a high speed of revolution.

The invention is illustrated by way of example in the accompanying drawings, in which—

Fig. 16 shows a modification of the propeller in which it is possible to adapt the boss to different motor shafts and to alter the length of the propeller blades in order thereby to ascertain the effective power of the motor selected for a propeller and thus to be able to determine the size of the propeller best suited to the motor, and Figs. 17 and 18 show in section and plan respectively the metal end piece by means of which the cross-pieces when threaded on the rods are pressed together and securely held.

Fig. 19 is a cross section of the propeller boss with an inserted bushing whose outer surface is cylindrical.

Fig. 20 is a side view and

Fig. 21 an end view of the bushing.

Fig. 22 is a side view of a boss with a tapering bore and a bushing with a corresponding conical exterior surface.

Fig. 23 is a side view of the conical bushing by itself.

Fig. 24 is a plan view of Fig. 22.

Fig. 25 illustrates the manner of fixing the steel rods with tapering ends in the boss of the propeller.

Figure 1:
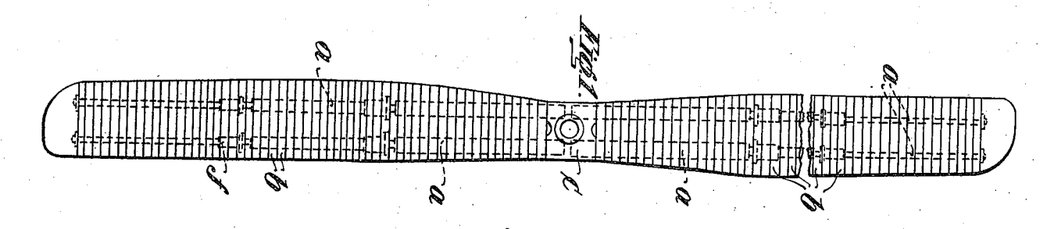
Fig. 1 shows a front view of a propeller the blades of which consist, according to the present invention, of cross-pieces which are threaded on a pair of steel rods.
Figure 2:
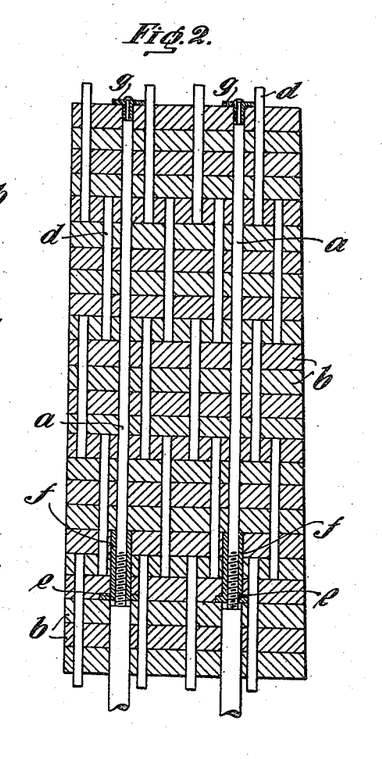
Fig. 2 shows on a larger scale the connection of the cross-pieces with the steel rods and with one another.

Referring to the drawings, the steel rods $a$, on which the cross-pieces $b$ of wood or other suitable material are threaded, are fixed in pairs to the boss $c$. The rods $a$ decrease in size towards their outer ends. The wooden cross-pieces $b$ are glued together and are also connected in groups by means of the pegs $d$ (Fig. 2) which are glued in and are arranged in different positions in the various groups, whereby the blades, which are constructed with a suitable angularity and with necessary pitch, are made quite rigid.

Figure 3:
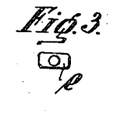
Figs. 3, 4 and 5 show different auxiliary means for fixing the cross-pieces to the steel rods.
Figure 4:
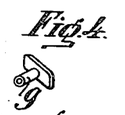
Figure 5:
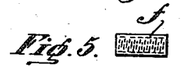

In order that complete security may be afforded against the action of centrifugal force the cross-pieces are secured in groups to the steel rods by means of cross-straps $e$ (Figs. 2 and 3) which are capable of being adjusted on and firmly fixed to said rods. For this purpose the steel rods are provided at several places with threads on each of which a socket-like nut $f$ (Figs. 2 and 5) can travel. By means of this nut a small retaining plate $e$, which is inserted over the rod is pressed firmly down behind the cross-piece situated at the threaded part and the corresponding group of cross pieces is thereby prevented from flying outwards. To the ends of the steel rods are fitted caps $g$ (Figs. 2 and 4) each of which is provided with a cross-strap. Said caps are secured by the rivet-like ends of the steel rods and their cross-straps hold fast the end group of the cross-pieces of each propeller blade.

Figures 6, 7, 8:
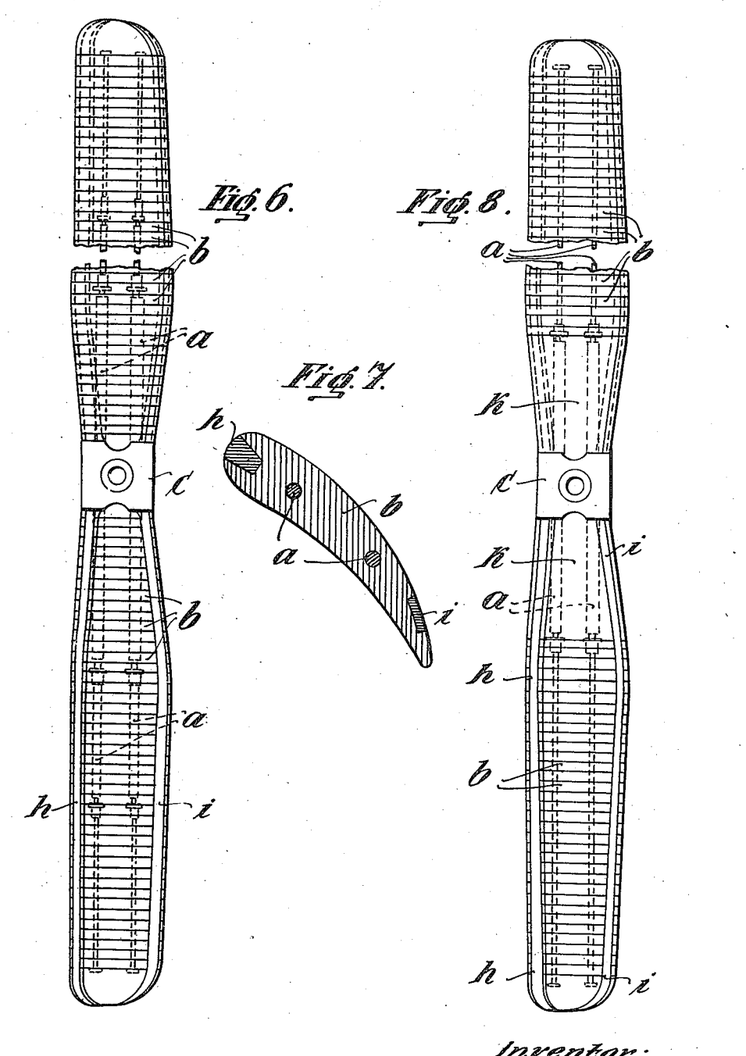
Fig. 6 shows a modified form of the propeller in which the cross-pieces are connected still more firmly together by means of a longitudinal strip or binding.
Fig. 7 is a cross-section of one of the blades of a propeller as illustrated in Fig. 6, on a larger scale.
Fig. 8 shows a further modification in which the narrow cross-pieces at the inner end of the blades are replaced by a longer sheet or board.

In order, in the case when the speed of revolution of the propeller is considerably increased above the limits formerly admissible, to ensure that no gaping occurs, owing to the action of the increased centrifugal force, between the cross-pieces at any part of the blade, said cross-pieces, as shown in Figs. 6 and 7, are provided with a continuous longitudinal binding which consists of longitudinal straps $h$ and $i$, of the same or similar material as the cross-pieces, which are glued or cemented in corresponding grooves. The arrangement is based on the knowledge that the materials, in particular wood, which are generally available for the cross-pieces on account of their good sticking power and light weight, are subjected to so great a pressure at higher speeds of revolution of the propeller owing to the increased centrifugal force that finally, inside one or other of the groups of cross-pieces which are secured by the steel rods, at a place where the glue or cement may happen to possess a somewhat smaller sticking power, a gap may occur between the cross pieces the size of which is dependent upon the compression of the remaining cross-pieces.

Owing to the longitudinal strips $h$ and $i$ the cross-pieces not only are given a greater adhesive surface but each separate cross-piece is in the highest degree also secured against separation from the next cross-piece by all the cross-pieces lying between it and the tip of the blade to an extent depending on the firmness with which said cross-pieces adhere to the longitudinal strips.

As can be seen from the cross-section drawn on a larger scale in Fig. 7, there are two grooves cut along the front edge of the blade and near the rear longitudinal edge respectively, said grooves pass cross-wise through the cross-pieces $b$ and are filled in with the longitudinal strips $h$ and $i$ respectively which are cemented in. In this manner a longitudinal binding, which passes through the cross-pieces is obtained, which eliminates any harmful action due to centrifugal force at very high speeds of revolution of the propeller.

As shown in Fig. 8, in this case it is advantageous to construct each of the parts $k$, between the boss $c$ of the propeller and the first retaining nuts of the steel rods $a$, as a whole. These can each be composed, for example, of two wooden boards glued together and provided with suitable grooves for the reception of the steel rods $a$ and also for the longitudinal strips $h$ and $i$ which are to be cemented in. In this case the strips $h$ and $i$, are suitably slightly enlarged towards the boss in so far as they lie in the parts $k$ and towards the tips of the blades in so far as they engage in the cross-pieces $b$, whereby at a still greater speed of revolution of the propeller any alteration in the position of the cross-pieces $b$ is prevented.

Figures 9, 10, 11:
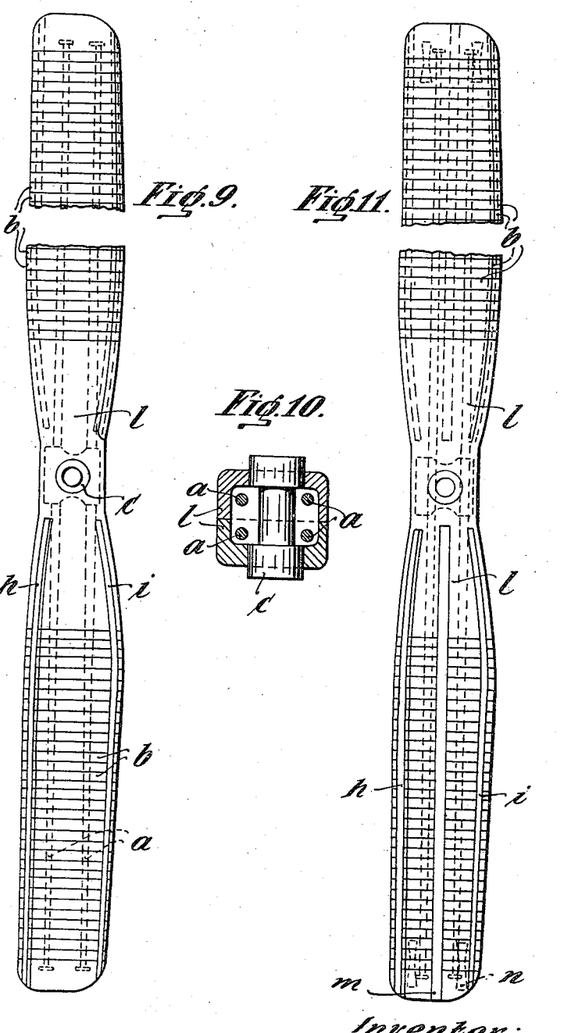
Fig. 9 shows another modification in which at the inner ends of both blades the cross-pieces are replaced by a longer sheet which also encases the boss of the propeller.
Fig. 10 is a section on a larger scale of the casing of the boss.
Fig. 11 shows a modification with a plurality of longitudinal bindings for the blades.

The two parts $k$, as shown in Figs. 9 and 10, can be replaced by a middle part $l$, preferably of longitudinally arranged halves, which encloses also the boss of the propeller and forms as a complete whole the common inner ends of both blades. The ends of the longitudinal strips $h$ and $i$ which are adjacent to the boss are glued into this middle part.

By this means the longitudinal bindings of both blades resulting from the glued in longitudinal strips are so brought into connection that a considerable part of the centrifugal force is taken up by the integral middle piece $O$ and the steel rods $a$ on which the cross-pieces $b$ are threaded and the retaining sockets $g$ fastened thereon are thereby relieved of a considerable part of their load. These parts can therefore be made considerably weaker and lighter and the boss $c$ can also be constructed of such strength as is necessary for fixing the steel rods.

The steel rods are still further relieved of their loads, as shown in Fig. 11, if a third longitudinal strip $m$ for each blade is fitted in the middle piece $l$. Said strip $m$ is let into the cross-pieces $b$ and cemented therewith in the same manner as the strips $h$ and $i$.

For securing the leaf which is situated at the outer end of each blade, it is advantageous to fix these to the adjacent cross-pieces, as shown in Fig. 11, by means of double dovetail-shaped pegs $n$.

The above-mentioned relief of the load on the steel rods is all the more important as with two blades composed of cross-pieces it is very advantageous, for the purpose of building up and retaining the shape of the blades, to employ one pair of rods for each blade and to insert both rods into the boss in such a manner that the plane which contains the central axis of each rod corresponds to the pitch of the blade in question. This arrangement has the result that the pair of rods of the one blade are cross-ways on to that of the other, the employment of single rods which extend over both blades is therefore out of the question. If these four steel rods alone have to withstand the whole of the centrifugal force they must be made considerably stronger and the boss also must then be made correspondingly heavier and stronger.

It must be further taken into consideration that the arrangement of one pair of rods for each of the two blades is also necessary in order to be able to give the blades a suitable obliquity in an axial direction, which is necessary to obtain a balance between the centrifugal force due to the rotation of the propeller and also the compression on the blade which is caused by the air resistance and thereby to obtain an increased efficiency and the greatest safety for the propeller.

This obliquity of the blades demands a corresponding obliquity of the pair of steel rods $a$ to the axis of the propeller.

This obliquity is obtained by the pair of steel rods $a$ belonging to each blade being fitted into transverse holes in the boss extending obliquely to the propeller shaft so as to automatically give rise to the desired obliquity of the blades.

Figures 12, 14, 15:
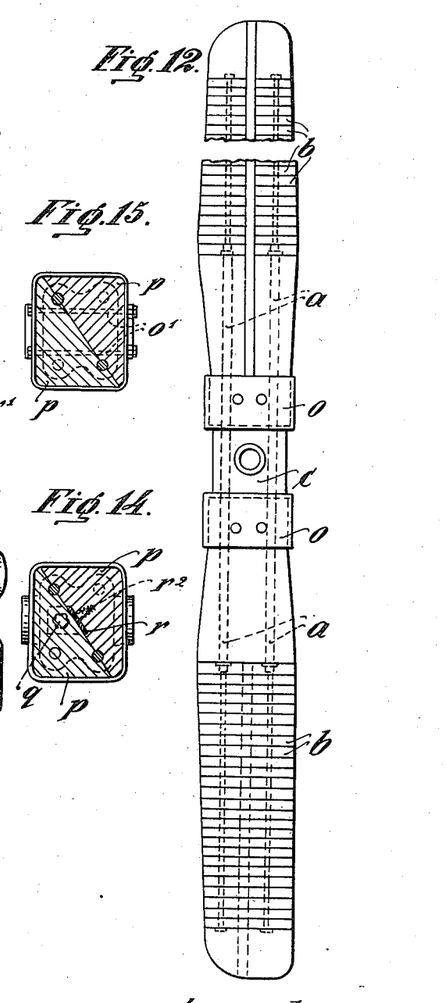
Fig. 12 shows still another modification in which the inner ends of the blades consist of long pieces that are firmly fixed in shoes attached to the boss of the propeller.
Fig. 14 is a cross-section of an inner blade end showing the manner in which the blade is fastened to the connecting plate in the shoe.
Fig. 15 shows how the blade is fastened in the shoe by means of bolts passed transversely through the shoe and inner end of the blade.
Figure 13:
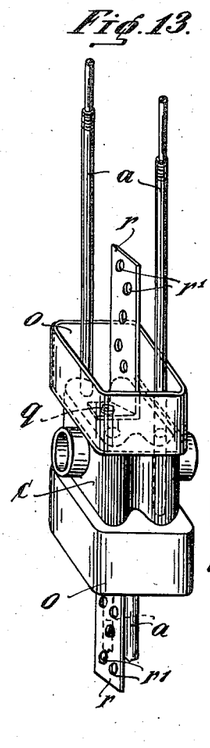
Fig. 13 is a perspective view showing the boss of the propeller fitted at each of its end walls with a shoe, and equipped with the steel rods onto which the cross-pieces are threaded and with connecting plates for fastening the inner ends of the propeller blades.

In order to safeguard the steel rods $a$ even at the highest speeds of revolution of the propeller a four-sided shoe $o$ is screwed or welded to each of the two end walls of the boss $c$ in the manner shown in Figs. 12 and 13. The boss itself has the pairs of steel rods $a$ fixed firmly into it. The pairs of steel rods $a$ are so positioned in the shoes $o$ as to lie on diagonals and the inner end of each blade is made of two similar long grained pieces of wood $p$ joined to each other on a plane defined by a said diagonal. Screwed fast to the sole of each shoe by a screw $q$ is an angular connecting strap $r$ whose surface lies in the said diagonal plane and which has a number of holes $r^1$ through which screws $r^2$ pass into the one wooden part of the inner blade end so that this part is firmly fixed in the shoe. This part is preferably provided with a groove into which the connecting strap fits as shown in Fig. 14.

The second part of the inner end of each blade is glued to its counter-part at the said diagonal plane and is nicely fitted into the shoe so that the space within it is entirely filled. To enhance the security of the attachment transverse bolts $o^1$ which pass through the shoe and the inner end of the blade may be provided as shown in Fig. 15. When such bolts are used the fixture of the blade end by the above-mentioned connecting strap may, in certain cases, be entirely dispensed with.

Through the inner end of each blade being tightly embraced by its shoe and in consequence of its attachment by the connecting strap or the bolts, or by both measures, the connection between the blade and the boss of the propeller is made exceedingly secure and at the same time the pair of steel rods is relieved in a very great measure of bending stresses.

Figures 16, 17, 18, 19, 20, 21, 22, 23, 24, 25:
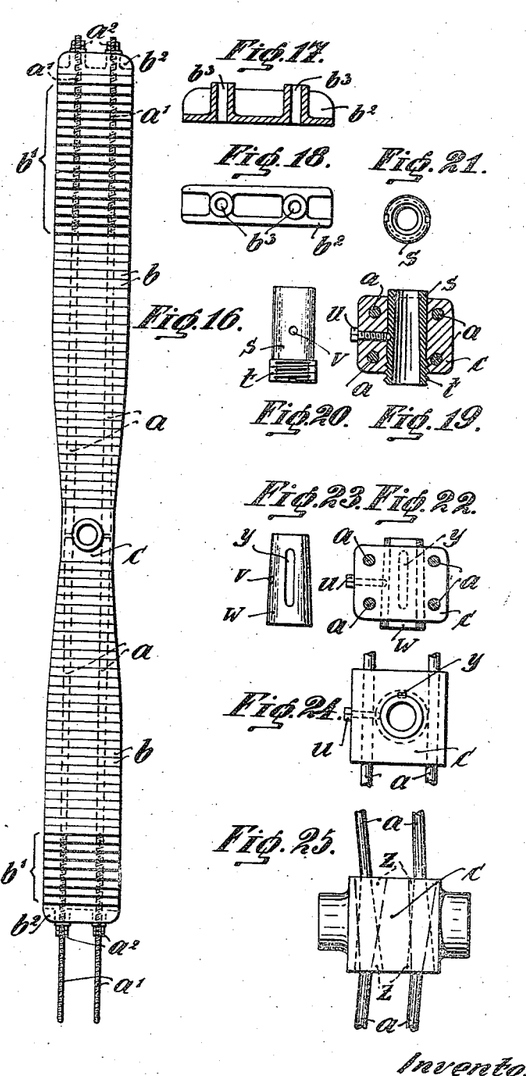

The propeller illustrated in Figs. 16–18 is so arranged that its diameter and blade surface can be altered within certain limits which are suited to practical requirements.

For this purpose the steel rods $a$, which are fitted in the boss $c$ are so formed that a number of cross-pieces, more or less as required can be removed from the ends of the blades or can be again replaced and firmly connected in a suitable manner with the remaining cross-pieces which are permanently fixed to the rods $a$.

The rods $a$ are suitably of conical form as far as the position to which the cross-pieces $b$, which are fixed on the rods and in fixed interconnection, reach, while the ends $a^1$ of the rods outwards from this position are cylindrical and provided with threads.

On these threaded ends $a^1$ a greater or less number of freely connectable and disconnectable strips $b^1$ are fitted, the number depending on the power of the motor which is experimentally driving the propeller. Over the last of these strips $b^1$ is placed the end-piece $b^2$ which is suitably of U-shaped cross-section and is provided with suitable boss-like projections $b^3$. The end-piece $b^2$ may consist of a light metal, for example, aluminium or a suitable light metal alloy.

By means of the nuts $a^2$ which are screwed on to the ends of the rods, the end-piece $b^2$ is pressed tight against the loosely arranged strips $b^1$ and secured in position.

With a propeller of which the blades can be altered in this manner it is possible to determine by the brake the effective power of a motor destined for a given propeller and thus to fix the size of the propeller best suited to this motor.

In order to enable the propeller to be readily attached to the shaft of any motor that might be deemed suitable the boss of the propeller $c$ may have a bore of such diameter that bushings may be inserted into it that are adapted to the shaft of the motor whose effective power is to be tried. According as the shaft of the particular motor in question is thinner or thicker, or as it tapers more or less, a bushing from the assortment kept for the purpose is selected and inserted into the boss of the propeller. The external diameters of all these bushings are quite equal so that they all fit the bore of the boss $c$ which may taper or be of a cylindrical shape.

Figs. 19, 20, 21 illustrate the latter type and Figs. 22, 23, 24 the former type of the boss.

In the modification shown in Fig. 19 the cylindrical bore of the boss has an internal thread at the end turned towards the motor. Into this bore a bushing $s$ will be inserted whose bore corresponds to the shaft of the motor selected to drive it. The bushings $s$ are provided with a threaded portion $t$ which enables them to be screwed into the boss. By means of a screw $u$ whose point enters a cavity $v$ in exterior of the bushing this latter can be fixed in the boss.

In the boss with tapering bore shown in Fig. 22 the exteriors of the bushing $w$ taper accordingly and are provided with a key whose size corresponds to the key-way $y$ in the bore of the boss, so that the bushing inserted in the boss is prevented from turning. Longitudinal displacement is prevented as shown in Fig. 19 by a screw $u$ that enters the cavity $v$.

To enable the steel rods $a$ onto which the cross-pieces are threaded to be fixed in the boss $c$ of the propeller in a perfectly secure manner the said steel rods are provided with tapering ends $z$, Fig. 25, and the transverse bores in the boss decrease in diameter in the direction towards the tips of the blades and are so dimensioned that the conical ends of the steel rods $a$ can only be fitted in under a suitably high pressure, so that it is impossible for the steel rods to work loose in the boss. The bores for the steel rods of each blade are also so displaced relatively one to the other in the direction of the axis of the propeller that the obliquity corresponding to the required pitch of the blade is also fixed by means of the steel rods, whereby a perfectly rigid propeller in which the pitch as well as the angular position relative to the propeller axis is always maintained, and therefore a most efficient propeller is obtained.

By setting the blades obliquely to the propeller shaft the steel rods are prevented from being subjected to bending stresses as will presently more fully appear. Since the weight of the machine drawn by the propeller acts upon its middle point the propeller is bent by the said weight in the same way as a beam capable of opposing an equal resistance to bending stresses would be bent if it were supported at its two ends and loaded to an equal extent at its middle point.

Hence, if the blades were set in the hub so to normally extend at right angles to the propeller shaft, the weight of the machine tugging at the middle point of the propeller while it is in operation would bend the blades continuously and thus subject the material of which the propeller is made to needless stresses and also reduce its effectiveness. This bending of the blades would be quite considerable if it were not counteracted by the centrifugal force which tends to stretch the blades out and to set them square to the shaft of the propeller. It will be obvious that the propeller blades are bent to an extent which is determined by the resultant of the two bending stresses acting upon them, viz, the load imposed on the propeller by the weight of the flying machine and the stresses due to centrifugal force.

Experiments have shown that with ordinary sizes and speeds of revolution the angle to which the blades are bent forwardly due to the ordinary stresses imposed upon them by the two above mentioned forces is about 2 to 3 degrees.

In the propeller hereinbefore described the steel rods $a$ are fitted into the hub $c$ in such a manner that the blades are normally inclined at the said angle of 2 to 3 degrees toward the perpendicular line erected upon the longitudinal axis of the propeller shaft. The result obtained hereby is that the still greater inclination or obliquity of the blades that would be caused by the pull exerted by the flying machine is counterbalanced by the opposing bending stress set up by the centrifugal force, and hence all bending stresses in the steel rods are avoided.

A propeller constructed in the manner described can be revolved at an exceptionally high speed, even with a proportionally greater blade-width, by using a suitable and more powerful motor, and so with a suitable pitch of blade the aircraft to which it is fitted is enabled to rise quickly from the ground and to fly at considerably greater speeds.

I claim:

1. In a propeller for air-craft, a blade comprising, steel rods, cross pieces of wood or the like arranged in groups on the steel rods and glued together, and cross members adapted to be displaced on the steel rods and to firmly secure the groups of cross pieces thereon.

2. In a propeller for air-craft, a blade comprising, steel rods, cross pieces of wood or the like arranged in groups on the steel rods and glued together, cross-members adapted to be displaced on the steel rods and to firmly secure the groups of cross pieces thereon, and pegs for interconnecting the groups of cross-pieces, the pegs of each group being displaced with respect to the pegs of an adjoining group.

3. In a propeller for air craft, a blade comprising, steel rods, cross pieces of wood or the like arranged in groups on the steel rods and glued together, cross members adapted to be displaced on the steel rods and to firmly secure the groups of cross pieces thereon, grooves extending across the cross-pieces, and continuous longitudinal strips fitted and cemented into the said grooves.

4. A propeller for air craft comprising, a boss, a board at the said boss, and blades, each comprising steel bars fixed in the boss and extending through the said board, cross pieces of wood or the like arranged in groups on the steel rods, cross members adapted to be displaced on the steel rods and to firmly secure the groups of cross-pieces thereon, grooves extending across the cross-pieces, and continuous longitudinal strips fitted and cemented into the said grooves, the said strips being enlarged towards both ends.

5. A propeller for air craft comprising, a boss, a middle piece enclosing the said boss and forming a portion of each propeller blade, steel bars fixed in the boss and extending through the said middle piece, cross pieces of wood or the like arranged in groups on the steel rods, cross members adapted to be displaced on the steel rods and to firmly secure the groups of cross-pieces thereon, grooves extending across the cross-pieces, and continuous longitudinal strips fitted and cemented into the said grooves and the middle piece, the said strips being enlarged towards both ends.

6. In a propeller for air-craft, a blade comprising, steel rods, cross pieces of wood or the like arranged in groups on the steel rods and glued together, cross members adapted to be displaced on the steel rods and to firmly secure the groups of cross-pieces thereon, and removable and replaceable cross-pieces at the end of the blade.

7. In a propeller for air-craft, a blade comprising, steel rods with threaded outer ends, cross-pieces of wood or the like arranged in groups on the steel rods and glued together, cross members adapted to be displaced on the steel rods and to firmly secure the groups of cross-pieces thereon, removable and replaceable cross-pieces on the said threaded outer ends of the rods, and a metal end piece for securing the removable cross pieces.

8. A propeller for air craft comprising, a boss with a bore for a motor shaft, lateral shoes on the said boss, and blades each comprising an inner end of long grained wood tightly fitted into a said shoe, steel rods fixed at one end in the said boss and extending through the said inner blade end, cross-pieces of wood or the like arranged in groups on the steel rods and glued together, and cross-members adapted to be displaced on the steel rods and to firmly secure the groups of cross pieces thereon.

9. A propeller for air craft comprising, a boss with a bore for a motor shaft, lateral shoes on the said boss, and blades each comprising, an inner end of long grained wood tightly fitted into said shoe, obliquely positioned, steel rods fixed at one end in the said boss and extending through the said inner blade end, cross-pieces of wood or the like arranged in groups on the steel rods and glued together, cross-members adapted to be displaced on the steel rods and to firmly secure the groups of cross pieces thereon, the said blade end being divided into two halves at a plane extending through the obliquely positioned rods, and an attaching member for securing the said blade end in its shoe.

10. A propeller for ascertaining the effective power of a motor comprising, a boss, steel rods with tapering ends fitted in the transverse holes in the said boss, cross pieces of wood or the like arranged in groups on the steel rods and glued together, and cross members adapted to be displaced on the steel rods and to firmly secure the groups of cross pieces thereon, the direction of the said holes in the boss being such that a certain obliquity of the blades with respect to the propeller shaft and the required pitch of the blades automatically results.

In testimony whereof I have signed my name to this specification.

JAKOB HAW.